UNITED STATES PATENT OFFICE.

LORENZ ACH, OF MANNHEIM, AND ALBERT ROTHMANN, OF HEIDELBERG, GERMANY, ASSIGNORS TO C. F. BOEHRINGER & SOEHNE, OF MANNHEIM-WALDHOF, GERMANY, A FIRM.

ARSINIC ACIDS AND PROCESS OF MAKING THE SAME.

1,075,279.  Specification of Letters Patent.  Patented Oct. 7, 1913.

No Drawing.  Application filed March 31, 1913. Serial No. 758,068.

*To all whom it may concern:*

Be it known that we, LORENZ ACH and ALBERT ROTHMANN, citizens of the German Empire, residing at Mannheim and Heidelberg, Germany, respectively, have invented certain new and useful Improvements in Arsinic Acids and the Process of Making the Same; and we do hereby declare the following to be a full, clear, and exact description of the invention, such as will enable others skilled in the art to which it appertains to make and use the same.

This invention relates to the art of preparing arsinic acids and, more particularly, nitrated methylnitramino-phenyl-arsinic acids, the object being to obtain starting materials from which arsenic compounds serving as valuable therapeutic agents and remedies and possessing a relatively low toxicity may be prepared.

In manufacturing one of the new arsinic acids we subject dimethyl-anilin-arsinic-oxid, which has been described in *Annalen der Chemie*, vol. 270 (1892) on page 140, to the action of a mixture of nitric and sulfuric acids, also known as "nitrating acid." This reaction results in the production of a well-crystallizing nitro compound to which the formula $C_7H_7N_4AsO_9$ is to be assigned. On titrating this body it was found that 1.004 grams of the same required 5.4 cubic centimeters of normal potassium hydrate (n-KOH) for complete neutralization, from which it follows that the acid is dibasic. Moreover, one nitro group may be split off when the compound is treated in the nitrometer according to Lunge; hence this nitro group must be bound to the nitrogen of the amino group. The structure of this new acid is hence expressed in the following formula;

$$CH_3N(NO_2)C_6H_2(NO_2)_2.AsO(OH)_2$$

and it is properly designated specifically as 3, 5-dinitro-4-methylnitramino benzene-1-arsinic acid and generically as a dinitro-methylnitramino-phenyl arsinic acid.

The above process may be modified in two ways under our invention. In the first place it is not necessary to start with dimethylanilin arsenic oxid, but in general, any arsenic compound of dimethylanilin which belongs to the same stage of oxidation as the arsenic oxid, and which yields p-dimethylanilin-arsinic acid under the oxidizing influence of the nitrating acid, such as, for example, p-dimethyl-anilin arsenious chlorid, may be employed as starting material. Or the said chlorid may be proceeded from directly as the starting material. Moreover, all aromatic compounds of arsenic generally, which contain the group

in the para position of the arsenic residue, and wherein R may denote hydrogen or the methyl group or an acyl residue, may serve as starting materials. When such compounds undergo nitration, two nitro groups pass into the benzene nucleus, while the third nitro group is bound to the nitrogen atom where it takes the place of the hydrogen atom or of the methyl group or the acyl residue, while the arsenic residue, in case it did not already exist in the form of an arsinic acid, is oxidized to form the arsinic acid. It will thus be seen that in all of these cases, no matter how different be the starting materials, the final product is obtained in the form of a dinitro-methylnitramino-phenyl-arsinic acid. From these arsinic acids, as has been stated, arsenic compounds having valuable therapeutic properties may be obtained by reduction, as has been set forth and claimed in our concurrent application for Letters Patent of the United States, Serial Number 686,343, filed March 26th, 1912.

To fully disclose our invention and to enable those skilled in the art to carry the same into effect, we will now describe in detail a number of examples embodying what we consider the preferred manner of carrying the same into effect. All proportions are understood to be by weight.

*Example 1—Preparation of an arsinic acid from para-dimethyl-anilin-arsenic oxid.*—One part of p-dimethyl-anilin-arsenic oxid is dissolved in 10 parts of concentrated sulfuric acid, and the solution added to a mixture of three parts concentrated nitric acid, of specific gravity 1.41, and 3 parts of concentrated sulfuric acid at 0°, centigrade, the whole being then heated in a water bath until no more red vapors are evolved. After having cooled, the whole is poured onto about 20 parts of ice. The nitrocompound is thus thrown out as a light yellow substance, which is then separated by siphoning, decanting or otherwise, whereupon it is washed with water and dried. The new compound, 3, 5-dinitro-4-methyl-nitramino benzene-1, arsinic acid, has the formula given above. It is readily-soluble in hot acetone, hot alcohol and in glacial acetic acid and insoluble in dilute mineral acids. In a solution of sodium hydrate, of sodium carbonate, or of sodium acetate it is readily soluble, being reprecipitated from such solutions with mineral acids. It deflagrates when heated on platinum-foil.

*Example 2—Preparation of the same arsinic acid from para-dimethyl-anilin-arsenious chlorid.*—4 parts of para-dimethyl-anilin-arsenious chlorid are dissolved in 40 parts of concentrated sulfuric acid, and the solution is added to a mixture of 6 parts of concentrated sulfuric acid and 6 parts of fuming nitric acid at a temperature of from 0° to 10°, centigrade, the whole being then heated to from 40° to 50°, centigrade, while stirring. Thereupon the mixture is allowed to cool and after cooling it is poured onto about 100 parts of ice, whereby the new acid dinitro-methylnitramino-phenyl-p-arsinic acid is thrown out and is then separated and purified as under Example 1.

*Example 3—Preparation of the arsinic acid from para-dimethyl-anilin-arsinic acid.*—4 parts of para-dimethyl-anilin-arsinic acid are dissolved in 40 parts of concentrated sulfuric acid and then nitrated as in Example 2 with nitrating acid. The rest of the process is carried out as under Example 2.

Generically considered the new process consists in treating with a nitrating reagent an aromatic compound containing arsenic and having the group

bound in the para position, where R may denote either hydrogen or a monovalent hydrocarbon radical such as methyl or an acyl residue.

What we claim and desire to secure by Letters Patent is:

1. The process of preparing compounds containing arsenic which comprises subjecting an aromatic compound of arsenic containing the group

in the para position, where R is a monovalent radical, to the action of a nitrating reagent.

2. The process of preparing compounds containing arsenic which comprises subjecting an aromatic compound of arsenic containing the group

in the para position, where R is a monovalent radical, to the action of a mixture of concentrated sulfuric acid and concentrated nitric acid.

3. The process of preparing compounds containing arsenic which consists in subjecting an aromatic compound of arsenic containing the group

in the para position, where R is a monovalent radical, to the action of a mixture of concentrated sulfuric acid and concentrated nitric acid under the influence of heat.

4. The process of preparing compounds containing arsenic which consists in subjecting an aromatic compound of arsenic containing the group

in the para position, where R is a monovalent radical, to the action of a mixture of concentrated sulfuric acid and concentrated nitric acid under the influence of heat, and then cooling and treating with ice.

5. The process of preparing compounds containing arsenic which comprises subjecting an aromatic compound of arsenic containing the group

in the para position to the action of a nitrating agent.

6. The process of preparing compounds containing arsenic which comprises subjecting an arsenic compound of dimethyl-anilin to the action of a nitrating agent.

7. The process of preparing compounds containing arsenic which comprises subjecting p-dimethyl-anilin-arsenic oxid to the action of a nitrating agent.

8. The process of preparing compounds containing arsenic which comprises subjecting p-dimethyl-anilin-arsenic oxid to the action of a mixture of concentrated sulfuric acid and concentrated nitric acid with the aid of heat, and cooling after the reaction has proceeded to the desired extent.

9. As a new chemical compound dinitro-methylnitramino-phenyl-p-arsinic acid having the formula,

which is readily soluble in hot acetone, hot alcohol and in glacial acetic acid, insoluble in dilute mineral acids, soluble in solutions of sodium hydrate, of sodium carbonate and of sodium acetate, being precipitated from such solutions by mineral acids, and which deflagrates when heated on platinum foil.

In testimony whereof we hereunto affix our signatures in the presence of two witnesses.

LORENZ ACH.
ALBERT ROTHMANN.

Witnesses:
JOSEPH PFEIFFER,
LEOPOLD BLUM.